United States Patent
Dossa et al.

(10) Patent No.: US 8,266,614 B2
(45) Date of Patent: Sep. 11, 2012

(54) METHODS AND APPARATUS FOR PRE-CONFIGURING SOFTWARE

(75) Inventors: Zahir Dossa, Boston, MA (US);
Hyduke Noshadi, Northridge, CA (US);
Solomon Michael Bisker, Fort Myers, FL (US); Suresh Balu, Chapel Hill, NC (US)

(73) Assignee: International Business Machines Corporation, Armonk, NY (US)

( * ) Notice: Subject to any disclaimer, the term of this patent is extended or adjusted under 35 U.S.C. 154(b) by 1219 days.

(21) Appl. No.: 11/625,966

(22) Filed: Jan. 23, 2007

(65) Prior Publication Data

US 2008/0178172 A1 Jul. 24, 2008

(51) Int. Cl.
G06F 9/445 (2006.01)
G06F 9/44 (2006.01)

(52) U.S. Cl. .................. 717/174; 717/120; 717/168

(58) Field of Classification Search .................. None
See application file for complete search history.

(56) References Cited

U.S. PATENT DOCUMENTS

| | | | | |
|---|---|---|---|---|
| 5,668,992 | A * | 9/1997 | Hammer et al. ................. | 713/1 |
| 6,519,581 | B1 * | 2/2003 | Hofmann et al. ............... | 706/47 |
| 6,662,357 | B1 * | 12/2003 | Bowman-Amuah .......... | 717/120 |
| 6,718,535 | B1 * | 4/2004 | Underwood .................. | 717/120 |
| 6,775,829 | B1 * | 8/2004 | Kroening ...................... | 717/175 |
| 6,990,660 | B2 * | 1/2006 | Moshir et al. ................. | 717/171 |
| 7,124,289 | B1 * | 10/2006 | Suorsa .......................... | 717/174 |
| 7,350,201 | B2 * | 3/2008 | Ferri et al. .................... | 717/168 |
| 7,359,949 | B2 * | 4/2008 | Fagerburg et al. ............ | 709/208 |
| 7,448,034 | B2 * | 11/2008 | Anderson et al. ............. | 717/176 |
| 7,584,470 | B2 * | 9/2009 | Barker et al. ................. | 717/174 |
| 7,607,126 | B2 * | 10/2009 | Read .............................. | 717/120 |
| 7,734,684 | B2 * | 6/2010 | Zeng et al. .................... | 709/203 |
| 7,743,147 | B2 * | 6/2010 | Suorsa et al. ................. | 717/174 |
| 7,827,545 | B2 * | 11/2010 | Choe et al. .................... | 717/168 |
| 8,019,835 | B2 * | 9/2011 | Suorsa et al. ................. | 717/168 |
| 2004/0003266 | A1 * | 1/2004 | Moshir et al. ................. | 717/174 |
| 2004/0226010 | A1 * | 11/2004 | Suorsa .......................... | 717/174 |
| 2005/0027846 | A1 * | 2/2005 | Wolfe et al. ................... | 709/223 |
| 2005/0097547 | A1 * | 5/2005 | Ramachandran et al. .... | 717/177 |
| 2007/0088630 | A1 * | 4/2007 | MacLeod et al. ............. | 705/28 |

OTHER PUBLICATIONS

Robert A. Ballance, et al., "Supercomputing Center Management Using AIRS", 2003, Proceedings of the 2003 Linux, pp. 1-21.*
Michael J. Katchabaw, et al., "Making distributed applications manageable through instrumentation", 1999, Elsevier Science Inc., pp. 81-97.*
Hanan L. Lutfiyya, et al., "Configuration Maintenance for Distributed Applications Management", vol. 8, No. 2, 2000, pp. 219-244.*

(Continued)

*Primary Examiner* — Tuan Q Dam
*Assistant Examiner* — Xi D Chen
(74) *Attorney, Agent, or Firm* — Chapin IP Law, LLC (57) ABSTRACT

A system, operating on a first computerized device, deploys an agent to a second computerized device. The agent, operating on the second computerized device, obtains the configuration data. The system receives, at the first computerized device, from the agent operating on the second computerized device, configuration data specific to the second computerized device. The system creates software for the second computerized device utilizing the configuration data. The software is customized based on the configuration data specific to the second computerized device. The system then deploys the software to the second computerized device for operation on the second computerized device.

20 Claims, 7 Drawing Sheets

OTHER PUBLICATIONS

Alexander Keller, et al., "Dynamic Dependencies in Applicaiton Service Management", May 5, 2000, IBM Research Report (Computer Science/Mathematics), pp. 1-7.*

Altiris, "Deployment Solution 6.5 Reference Guide", 2006, published online; [retrieved on Sep. 27, 2011]; Retrieved from Internet <URL:http://web.archive.org/web/20060419200442/http:/www.altiris.com/upload/deployment_002.pdf>; pp. 1-553.*

Aldanondo, Vareilles, "Configuration for mass customization: hot to extend product configuration towards requirements and process configuration", 2008, Springer; [retrieved on Apr. 30, 2012]; Retrieved from Internet <URL:http://www.springerlink.com/content/3u1768k468587k76/fulltext.pdf>;pp. 521-535.*

Callahan, Purtilo "A Packaging System for Heterogeneous Execution Environments", 1991, IEEE; [retrieved on Apr. 30, 2012]; Retrieved from Internet <URL:http://ieeexplore.ieee.org/stamp/stamp.jsp?tp=&arnumber=87286>;pp. 626-635.*

Griss, "Software resue: From library to factory", 1993, IBM Systems Journal; [retrieved on Apr. 30, 2012]; Retrieved from Internet <URL:http://www.springerlink.com/content/3u1768k468587k76/fulltext.pdf>;pp. 521-535./ieeexplore.ieee.org/stamp/stamp.jsp?tp=&arnumber=5387334>;pp. 548-566.*

* cited by examiner

210 RECEIVE AT THE FIRST COMPUTERIZED DEVICE, FROM THE AGENT OPERATING ON THE SECOND COMPUTERIZED DEVICE, CONFIGURATION DATA SPECIFIC TO THE SECOND COMPUTERIZED DEVICE, THE CONFIGURATION DATA OBTAINED BY THE AGENT OPERATING ON THE SECOND COMPUTERIZED DEVICE

> 211 OBTAIN CONFIGURATION DATA ASSOCIATED WITH AT LEAST ONE OTHER COMPUTERIZED DEVICE IN COMMUNICATION WITH THE SECOND COMPUTERIZED DEVICE, THE CONFIGURATION DATA, ASSOCIATED WITH THE AT LEAST ONE OTHER COMPUTERIZED DEVICE, NECESSARY FOR CREATION OF THE SOFTWARE FOR THE SECOND COMPUTERIZED DEVICE

OR

> 212 REQUEST ACCESS TO OBTAIN THE CONFIGURATION DATA FROM THE SECOND COMPUTERIZED DEVICE
>
>> 213 REQUEST ACCESS FROM A USER ASSOCIATED WITH THE SECOND COMPUTERIZED DEVICE
>>
>> ↓
>>
>> 214 NOTIFY THE USER WHAT CONFIGURATION DATA WILL BE OBTAINED FROM THE SECOND COMPUTERIZED DEVICE
>>
>> ↓
>>
>> 215 WAIT TO RECEIVE PERMISSION FROM THE USER PRIOR TO OBTAINING THE CONFIGURATION DATA

222 DEPLOY THE SOFTWARE TO THE SECOND COMPUTERIZED DEVICE FOR OPERATION ON THE SECOND COMPUTERIZED DEVICE

223 INSTALL THE SOFTWARE ON THE SECOND COMPUTERIZED DEVICE

OR

224 RECEIVE A STATUS FROM THE SECOND COMPUTERIZED DEVICE, THE STATUS ASSOCIATED WITH A DEPLOYMENT OF THE SOFTWARE ON THE SECOND COMPUTERIZED DEVICE

225 RECEIVE AN EVALUATION OF THE DEPLOYMENT OF THE SOFTWARE ON THE SECOND COMPUTERIZED DEVICE

*FIG. 7*

METHODS AND APPARATUS FOR PRE-CONFIGURING SOFTWARE

BACKGROUND

Conventional computerized devices, such as personal computers, laptop computers, and data communications devices (e.g., routers, switches, gateways and the like) are configured with programs (i.e., software applications, Operating System applications, etc) that install software applications on the computerized device. Often, the software applications to be installed are comprised of large sets of files that include executable files, dynamically linked libraries (DLL), help files, data files, etc.

Software is created for easy installation on a computerized device, with minimal effort on the part of a user installing the software. Ideally, software for installation requires that a user invokes the installation package, and the installation performs a complete installation.

SUMMARY

Conventional technologies for installing software suffer from a variety of deficiencies. In particular, conventional technologies for installing software are limited in that installing the software is just one step of a long and tedious process of deploying software on a computerized device. After the software is installed, a user may need to properly configure the settings for the computerized device, to complete the installation. Each computerized device, on which the software is installed, must be configured for the newly installed software. Unless all the computerized devices, on which software is being installed, have uniform configurations (i.e., the same software, the same versions of software, the same versions of databases, etc.), each computerized device must be individually configured. This task may add many additional hours to the process of installing software.

Additionally, some software is installed on networks where multiple computerized devices are in communication with each other. In this scenario, correctly configuring the software requires knowledge of the configurations of each of those multiple computerized devices in communication with the network, adding even more hours to the process of installing software.

Embodiments disclosed herein significantly overcome such deficiencies and provide a software configuring process, operating in a first computerized device, that delivers customized pre-configured software to a second computerized device. In an example embodiment, the customized pre-configured software is a customized solution deployment package consisting of software and appropriate installation and configuration scripts. The software configuring process deploys an agent, from the first computerized device, to the second computerized device, to obtain configuration data from the second computerized device. Using the configuration data, the software configuring process creates customized software for the second computerized device. The software configuring process deploys the pre-configured customized software to the second computerized device such that the software can be installed, and correctly configured, on the second computerized device with a minimal amount of user interaction. In an example embodiment, the software configuring process deploys an agent to a plurality of second computerized devices, obtains the configuration data for the plurality of second computerized devices, and then deploys the pre-configured customized software to the plurality of second computerized device such that the software can be installed, and correctly configured, on the plurality of second computerized device with a minimal amount of user interaction.

The software configuring process obtains the configuration data from a configuration database that is in communication with the second computerized device. In an example embodiment, the software configuring process requests the configuration data from the configuration database prior to obtaining the configuration data. In yet another example embodiment, the software configuring process requests permission, from a user, and waits to receive permission to obtain the configuration data prior to obtaining the configuration data from the configuration database.

In an example embodiment, the first computerized device is in communication with at least one other computerized device, such as a network of computerized devices. The software configuring process obtains configuration data, associated with the other computerized device, from the configuration database that is in communication with the first computerized device (and any other computerized devices that are in communication with the first computerized device). The configuration data associated with the other computerized device is necessary for pre-configuring the customized software for the second computerized device.

The software configuring process transmits the software to the second computerized devices, and installs the pre-configured customized software on the second computerized device. In an example embodiment, the software configuring process receives a status, associated with the installation of the pre-configured customized software, from the second computerized device. In another example embodiment, the software configuring process receives an evaluation of the installation of the software on the second computerized device.

The software configuring process deploys an agent, from a first computerized device to a second computerized device. The agent, operating on the second computerized device, obtains configuration data that is specific to the second computerized device. The software configuring process receives, at the first computerized device, the configuration data from the agent. The software configuring process creates software for the second computerized device utilizing the configuration data. The software is customized based on the configuration data specific to the second computerized device. The software configuring process then deploys the software to the second computerized device for operation on the second computerized device.

During an example operation of one embodiment, suppose a second computerized device requires an update to a suite of document processing applications. The software configuring process, operating on a first computerized device, deploys an agent to the second computerized device to obtain configuration data associated with the second computerized device. Included in the configuration data is information such as:

i) software already installed on the second computerized device ii) the operating system installed on the second computerized device iii) the amount of memory on the second computerized device In this scenario, the configuration data obtained by the agent reveals that a spreadsheet component of the suite of document processing applications is already installed on the second computerized device.

Using the configuration data, the software configuring process creates pre-configured customized software to install the suite of document processing applications on the second computerized device. However, during the creation of the software, the software configuring process removes the spreadsheet component from the software since the agent has determined that an up to date version of the spreadsheet component is already installed on the second computerized device. The software configuring process deploys the pre-configured customized software to the second computerized device, and installs the software on the second computerized device.

Other embodiments disclosed herein include any type of computerized device, workstation, handheld or laptop computer, or the like configured with software and/or circuitry (e.g., a processor) to process any or all of the method operations disclosed herein. In other words, a computerized device such as a computer or a data communications device or any type of processor that is programmed or configured to operate as explained herein is considered an embodiment disclosed herein.

Other embodiments disclosed herein include software programs to perform the steps and operations summarized above and disclosed in detail below. One such embodiment comprises a computer program product that has a computer-readable medium including computer program logic encoded thereon that, when performed in a computerized device having a coupling of a memory and a processor, programs the processor to perform the operations disclosed herein. Such arrangements are typically provided as software, code and/or other data (e.g., data structures) arranged or encoded on a computer readable medium such as an optical medium (e.g., CD-ROM), floppy or hard disk or other a medium such as firmware or microcode in one or more ROM or RAM or PROM chips or as an Application Specific Integrated Circuit (ASIC). The software or firmware or other such configurations can be installed onto a computerized device to cause the computerized device to perform the techniques explained herein as embodiments disclosed herein.

It is to be understood that the system disclosed herein may be embodied strictly as a software program, as software and hardware, or as hardware alone. The features disclosed herein may be employed in data communications devices and other computerized devices and software systems for such devices such as those manufactured by IBM Corporation of Research Triangle Park, N.C.

BRIEF DESCRIPTION OF THE DRAWINGS

The foregoing and other objects, features and advantages disclosed herein will be apparent from the following description of particular embodiments disclosed herein, as illustrated in the accompanying drawings in which like reference characters refer to the same parts throughout the different views. The drawings are not necessarily to scale, emphasis instead being placed upon illustrating the principles disclosed herein.

DETAILED DESCRIPTION

Embodiments disclosed herein include methods and a computer system that perform a software configuring process that delivers pre-configured customized software to a computerized device. The software configuring process, operating in a first computerized device, that delivers customized pre-configured software to a second computerized device. In an example embodiment, the customized pre-configured software is a customized solution deployment package consisting of software and appropriate installation and configuration scripts. The software configuring process deploys an agent, from the first computerized device, to the second computerized device, to obtain configuration data from the second computerized device. Using the configuration data, the software configuring process creates customized software for the second computerized device. The software configuring process deploys the pre-configured customized software to the second computerized device such that the software can be installed, and correctly configured, on the second computerized device with a minimal amount of user interaction. In an example embodiment, the software configuring process deploys an agent to a plurality of second computerized devices, obtains the configuration data for the plurality of second computerized devices, and then deploys the pre-configured customized software to the plurality of second computerized device such that the software can be installed, and correctly configured, on the plurality of second computerized device with a minimal amount of user interaction.

The software configuring process obtains the configuration data from a configuration database that is in communication with the second computerized device. In an example embodiment, the software configuring process requests the configuration data from the configuration database prior to obtaining the configuration data. In yet another example embodiment, the software configuring process requests permission, from a user, and waits to receive permission to obtain the configuration data prior to obtaining the configuration data from the configuration database.

In an example embodiment, the first computerized device is in communication with at least one other computerized device, such as a network of computerized devices. The software configuring process obtains configuration data, associated with the other computerized device, from the configuration database that is in communication with the first computerized device (and any other computerized devices that are in communication with the first computerized device). The configuration data associated with the other computerized device is necessary for pre-configuring the customized software for the second computerized device.

The software configuring process transmits the software to the second computerized devices, and installs the pre-configured customized software on the second computerized device. In an example embodiment, the software configuring process receives a status, associated with the installation of the pre-configured customized software, from the second computerized device. In another example embodiment, the software configuring process receives an evaluation of the installation of the software on the second computerized device.

The software configuring process deploys an agent, from a first computerized device to a second computerized device. The agent, operating on the second computerized device, obtains configuration data that is specific to the second computerized device. The software configuring process receives, at the first computerized device, the configuration data from the agent. The software configuring process creates software for the second computerized device utilizing the configuration data. The software is customized based on the configuration data specific to the second computerized device. The software configuring process then deploys the software to the second computerized device for operation on the second computerized device.

Figure 1:
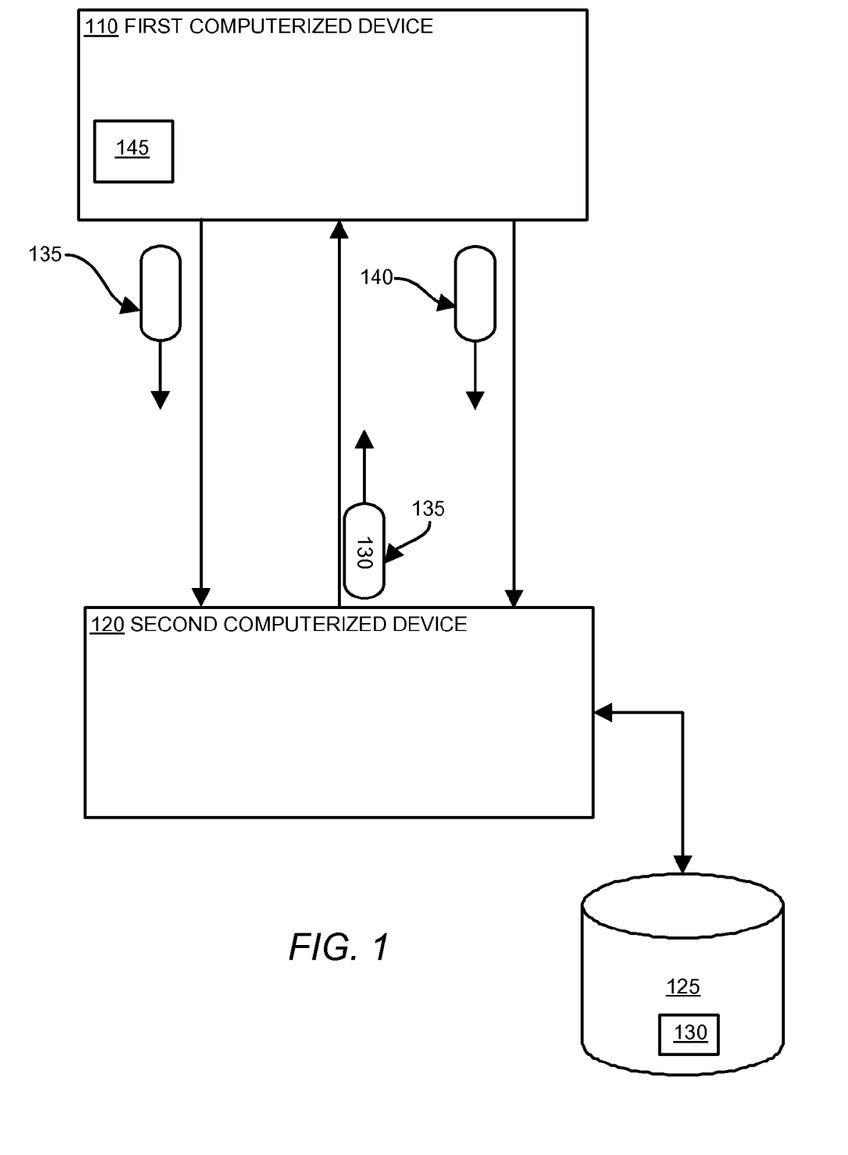
FIG. 1 shows a system executing a software configuring process according to one embodiment disclosed herein.

FIG. 1 is a block diagram illustrating example architecture of embodiments disclosed herein. The software configuring process 145, operating on a first computerized device 110, deploys an agent 135 to a second computerized device 120 to obtain configuration data 130 from a configuration database 125. The software configuring process 145, operating on a first computerized device 110, receives the configuration data 130, via the agent 135. The software configuring process 145 creates software 140, and deploys the software 140 to the second computerized device 120.

Figure 2:
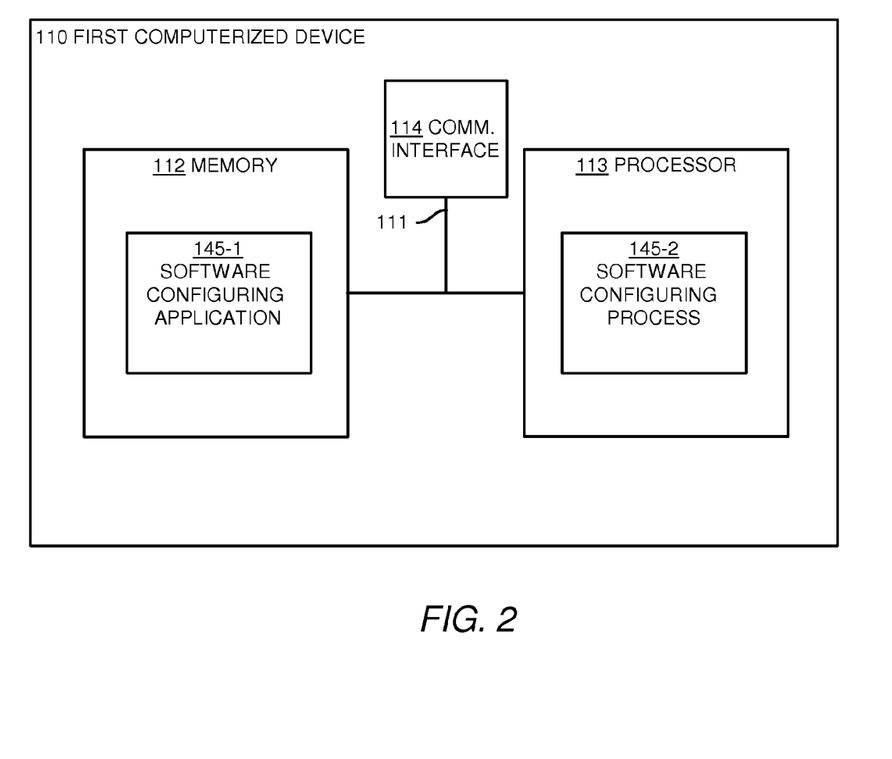
FIG. 2 shows a block diagram of a computer system according to one embodiment disclosed herein.

FIG. 2 illustrates an example architecture of a first computerized device 110. The first computerized device 110 may be any type of computerized device such as a personal computer, workstation, portable computing device, console, laptop, network terminal or the like. In this example, the first computerized device 110 includes an interconnection mechanism 111 that couples a memory system 112, a processor 113, and a communications interface 114. The communications interface 114 enables the first computerized device 110 to communicate with other devices (i.e., other computers) on a network (not shown). This can allow access to the software configuring application by remote computer systems.

The memory system 112 may be any type of computer readable medium that is encoded with an software configuring application 145-1 that may be embodied as software code such as data and/or logic instructions (e.g., code stored in the memory or on another computer readable medium such as a removable disk) that supports processing functionality according to different embodiments described herein. During operation of the first computerized device 110, the processor 113 accesses the memory system 112 via the interconnect 111 in order to launch, run, execute, interpret or otherwise perform the logic instructions of the software configuring application 145-1. Execution of software configuring application 145-1 in this manner produces processing functionality in a software configuring process 145-2. In other words, the software configuring process 145-2 represents one or more portions of runtime instances of the software configuring application 145-1 (or the entire application 145-1) performing or executing within or upon the processor 113 in the first computerized device 110 at runtime. It is to be understood that embodiments disclosed herein include the applications (i.e., the un-executed or non-performing logic instructions and/or data) encoded within a computer readable medium such as a floppy disk, hard disk or in an optical medium, or in a memory type system such as in firmware, read only memory (ROM), or, as in this example, as executable code within the memory system 112 (e.g., within random access memory or RAM). It is also to be understood that other embodiments disclosed herein can provide the applications operating within the processor 113 as the processes. While not shown in this example, those skilled in the art will understand that the computer system may include other processes and/or software and hardware components, such as an operating system, that have been left out of this illustration for ease of description.

Further details of configurations explained herein will now be provided with respect to a flow chart of processing steps that show the high level operations disclosed herein to perform the software configuring process 145-2.

Figure 3:
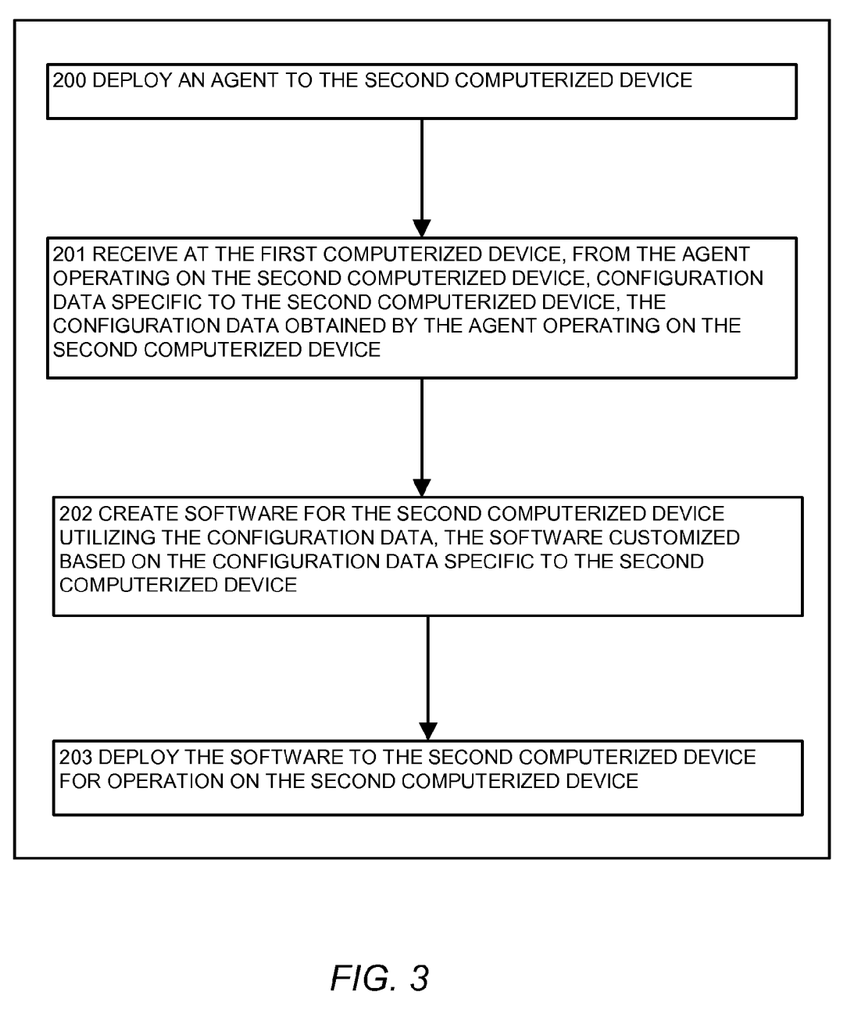
FIG. 3 illustrates a flowchart of a procedure performed by the system of FIG. 1 when the software configuring process deploys an agent to the second computerized device, according to embodiments disclosed herein.

FIG. 3 is a flowchart of the steps performed by the software configuring process 145-2 when it deploys an agent 135 to the second computerized device 120.

In step 200, the software configuring process 145-2 deploys an agent 135 to the second computerized device 120. In an example embodiment, the software configuring process 145-2 operates on a first computerized device 110, and deploys the agent 135 from the first computerized device 110 to the second computerized device 120.

In step 201, the software configuring process 145-2 receives the configuration data 130 obtained by the agent 135 operating on the second computerized device 120. The configuration data 130 is received by the software configuring process 145-2 at the first computerized device 110, from the agent 135 operating on the second computerized device. In other words, the software configuring process 145-2, operating on the first computerized device 110, deploys the agent 135 to the second computerized device 120. The agent 135, operating on the second computerized device 120, obtains configuration data 130, and transmits the configuration data 130 back to the software configuring process 145-2, operating on the first computerized device 110. The configuration data 130 is specific to the second computerized device 120 and contains configuration information associated with the second computerized device 120 such as operating system, software applications, versions of software applications, databases, etc.

In step 202, the software configuring process 145-2 creates software 140 for the second computerized device 120 utilizing the configuration data 130. The software 140 is pre-configured and customized based on the configuration data 130 specific to the second computerized device 120. In an example embodiment, a software solution developer creates the customized software specifically for the second computerized device 120. The software solution developer uses the configuration data 130, obtained by the agent 135, to create pre-configured customized software 140 for the second computerized device 120. In an example embodiment, the customized software is a customized solution deployment package consisting of software and appropriate installation and configuration scripts.

In step 203, the software configuring process 145-2 deploys the software 140 to the second computerized device 120 for operation on the second computerized device 120. The software configuring process 145-2 deploys the software 140 to the second computerized device 120 where the software 140 is installed and configured on the second computerized device 120. In an example embodiment, installing and configuring the software 140 on the second computerized device 120 is a 'one click' operation by a user operating the second computerized device 120. In other words, the installation and configuration of the software 140 on the second computerized device 120 requires minimal interaction by the user, thus eliminating the many hours required to configure the software 140 on the second computerized device 120.

Figure 4:
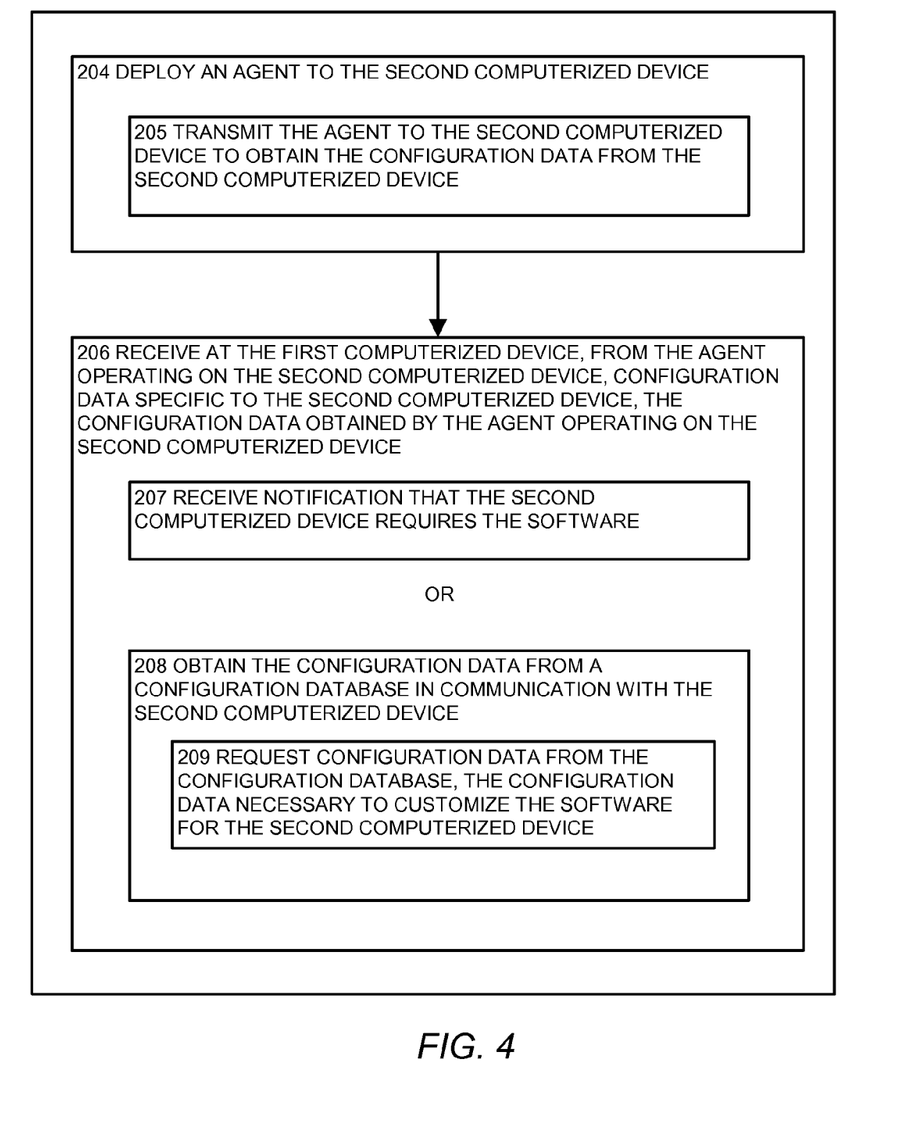
FIG. 4 illustrates a flowchart of a procedure performed by the system of FIG. 1 when the software configuring process deploys an agent to the second computerized device, and transmits the agent to the second computerized device to obtain the configuration data from the second computerized device, according to embodiments disclosed herein.

FIG. 4 is a flowchart of the steps performed by the software configuring process 145-2 when it deploys an agent 135 to the second computerized device 120.

In step 204, the software configuring process 145-2 deploys an agent 135 to the second computerized device 120. In an example embodiment, the software configuring process 145-2 operates on a first computerized device 110, and deploys the agent 135 from the first computerized device 110 to the second computerized device 120.

In step 205, the software configuring process 145-2 transmits the agent 135 to the second computerized device 120 to obtain the configuration data 130 from the second computerized device 120.

In step 206, the software configuring process 145-2 receives the configuration data 130 obtained by the agent 135 operating on the second computerized device 120. The configuration data 130 is received by the software configuring process 145-2 at the first computerized device 110, from the agent 135 operating on the second computerized device 120. In other words, the software configuring process 145-2, operating on the first computerized device 110, deploys the agent 135 to the second computerized device 120. The agent 135, operating on the second computerized device 120, obtains configuration data 130, and transmits the configuration data 130 back to the software configuring process 145-2, operating on the first computerized device 110. The configuration data 130 is specific to the second computerized device 120, and contains configuration information associated with the second computerized device 120 such as operating system, software applications, versions of software applications, etc.

In step 207, the software configuring process 145-2 receives notification that the second computerized device 120 requires the software 140. In an example embodiment, the software configuring process 145-2, operating on the first computerized device 110, receives notification that the second computerized device 120 requires software 140 to be installed and configured on the second computerized device 120. In one embodiment, the notification is received from the second computerized device 120. In another embodiment, the notification is received from a computerized device (not shown) other than the second computerized device 120.

Alternatively, in step 208, the software configuring process 145-2 obtains the configuration data 130 from a configuration database 125 in communication with the second computerized device 120. The configuration database 125 contains information such as what software 140 is installed on the second computerized device 120, what other computerized devices (not show) are on a network that is in communication with the second computerized device 120, what is the operating system of the second computerized device 120, how much memory is on the second computerized device 120, what types and versions of databases exist on the second computerized device 120, etc.

In step 209, the software configuring process 145-2 requests the configuration data 130 from the configuration database 125. In an example embodiment, the software configuring process 145-2 obtains the configuration data 130 that is needed (to customize software 140 for the second computerized device 120) from the configuration database 125 (for example performing a database query to retrieve the configuration data 130 from the configuration database 125). In another example embodiment, the software configuring process 145-2 requests specific configuration data 130 from the configuration database 130. The specific configuration data 130 is necessary to customize the software 140 for the second computerized device 120 (for example specifically requesting the version of the operating system used on the second computerized device 120).

Figure 5:
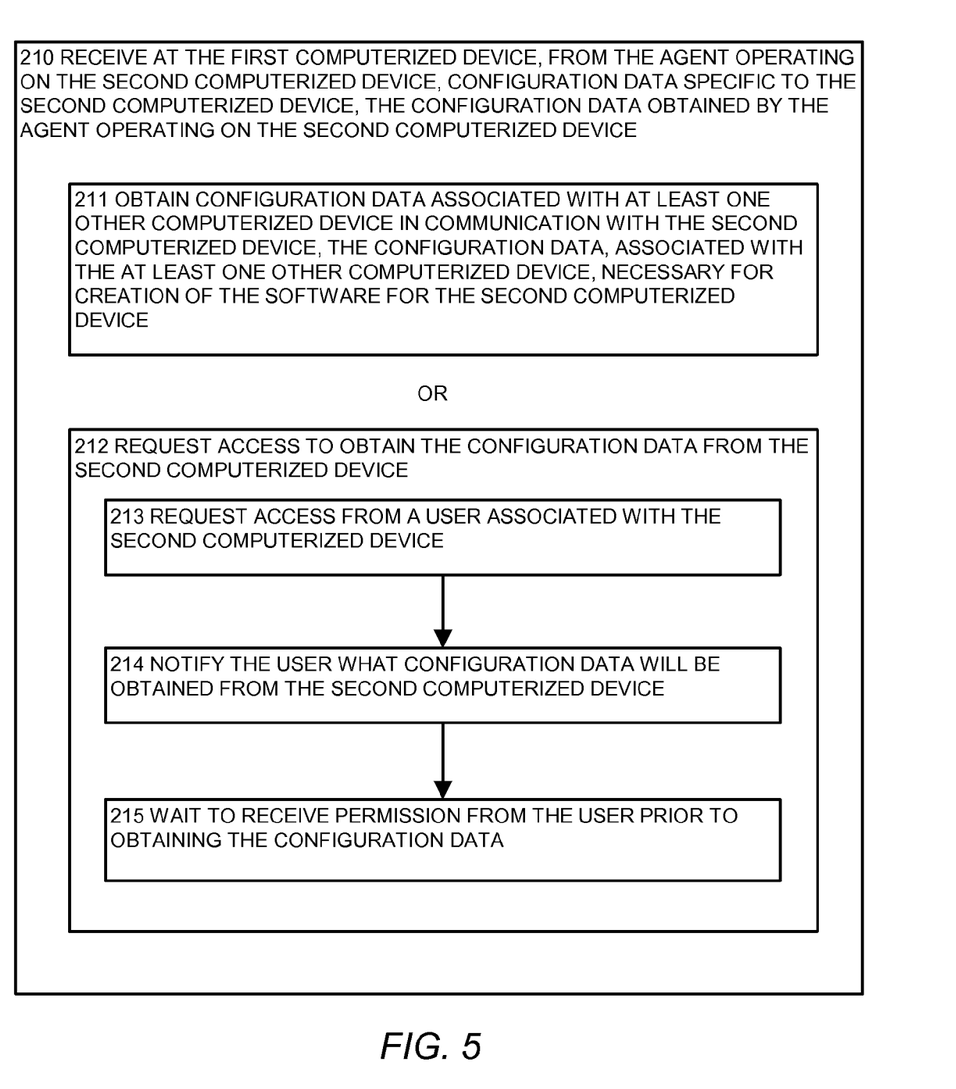
FIG. 5 illustrates a flowchart of a procedure performed by the system of FIG. 1 when the software configuring process receives at the first computerized device, from the agent operating on the second computerized device, configuration data specific to the second computerized device, the configuration data obtained by the agent operating on the second computerized device, according to embodiments disclosed herein.

FIG. 5 is a flowchart of the steps performed by the software configuring process 145-2 when it receives at the first computerized device 110, from the agent 135 operating on the second computerized device 120, configuration data 125 specific to the second computerized device 120.

In step 210, the software configuring process 145-2 receives the configuration data 130 obtained by the agent 135 operating on the second computerized device 120. The configuration data 130 is received by the software configuring process 145-2 at the first computerized device 110, from the agent 135 operating on the second computerized device. In other words, the software configuring process 145-2, operating on the first computerized device 110, deploys the agent 135 to the second computerized device 120. The agent 135, operating on the second computerized device 120, obtains configuration data 130, and transmits the configuration data 130 back to the software configuring process 145-2, operating on the first computerized device 110. The configuration data 130 is specific to the second computerized device 120, and contains configuration information associated with the second computerized device 120 such as operating system, software applications, versions of software applications, etc. In an example embodiment, the software configuring process 145-2 also operates on the second computerized device 120.

In step 211, the software configuring process 145-2 obtains configuration data associated with at least one other computerized device in communication with the second computerized device 120. The configuration data 125, associated with at least one other computerized device is necessary for creation of the software 140 for the second computerized device 120. In an example embodiment, the second computerized device 120 is in communication with other computerized devices (not shown) on a network. In order to provide properly pre-configured customized software 140 to the second computerized device 120, the software configuring process 145-2 requires configuration data 130 associated with other computerized devices (not shown) that are in communication with the second computerized device 120.

Alternatively, in step 212, the software configuring process 145-2 requests access to obtain the configuration data 130 from the second computerized device 120. In an example embodiment, a security process is in place on the second computerized device 120. The software configuring process 145-2 must request, and receive permission for access prior to obtaining the configuration data 130 from the configuration database 125. This security process is to prevent malicious software from obtaining unauthorized configuration data 130.

In step 213, the software configuring process 145-2 requests access from a user associated with the second computerized device 120. In an example embodiment, permission to access the configuration data 130 from the configuration database 125 is granted (or not granted) by a user, such as a system administrator, operating the second computerized device 120.

In step 214, the software configuring process 145-2 notifies the user what configuration data 130 will be obtained from the second computerized device 120. Prior to receiving access to obtain the configuration data 130, the software configuring process 145-2 provides the user with an inventory of what configuration the agent 135 will obtain data 130 from the configuration database 125. Typically, a user, such as a system administrator, decides what configuration data 130 will be obtained from the configuration database 125 by the agent 135.

In step 215, the software configuring process 145-2 waits to receive permission from the user prior to obtaining the configuration data 130. When the software configuring process 145-2 receives permission to obtain the configuration data 130, for example, from a user such as a system administrator, the software configuring process 145-2 obtains the configuration data 130 from the configuration database 125. The software configuring process 145-2, operating on the first computerized device 110, then receives the configuration data 130 necessary to pre-configure customized software 140 for the second computerized device 120.

Figure 6:
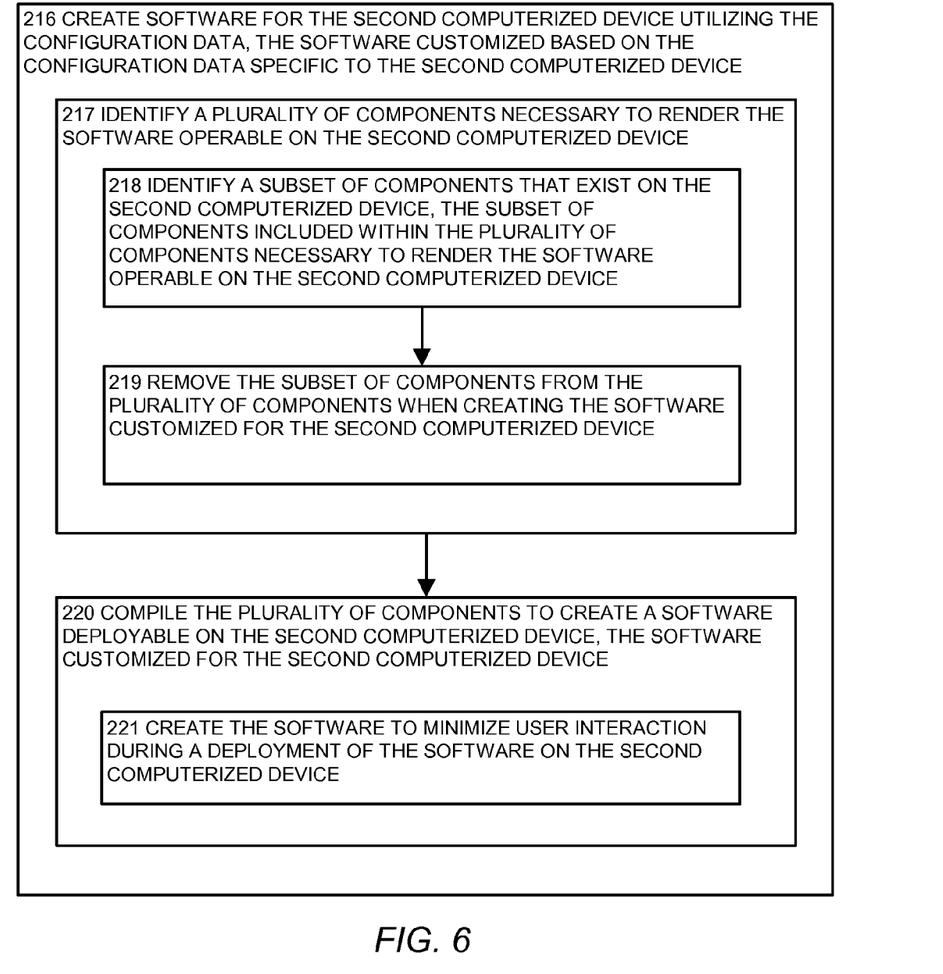
FIG. 6 illustrates a flowchart of a procedure performed by the system of FIG. 1 when the software configuring process creates software for the second computerized device utilizing the configuration data, the software customized based on the configuration data specific to the second computerized device, according to embodiments disclosed herein.

FIG. 6 is a flowchart of the steps performed by the software configuring process 145-2 when it creates software 140 for the second computerized device 120 utilizing the configuration data 130.

In step 216, the software configuring process 145-2 creates software 140 for the second computerized device 120 utilizing the configuration data 130. The software 140 is customized based on the configuration data 130 specific to the second computerized device 120. In an example embodiment, a software solution developer creates the customized software specifically for the second computerized device 120. In one example configuration, the software solution developer receives a notification that the second computerized device 120 requires the software 140. The software solution developer begins to create the software 140 while the agent 135 is obtaining configuration data 130 from the second computerized device 120. Using the configuration data 130, the software solution developer then pre-configures the customized software 140 for the second computerized device 120.

In step 217, the software configuring process 145-2 identifies a plurality of components necessary to render the software 140 operable on the second computerized device 120. The software 140 may comprise, for example, a plurality of software applications, each of which have libraries, include files, databases, etc. These components are necessary for each of the software applications to be properly installed and configured on the second computerized device 120. The software configuring process 145-2 identifies all the components needed to create software 140 that is customized for the second computerized device 120. The customized software 140 can be properly installed and configured on the second computerized device 120.

In step 218, the software configuring process 145-2 identifies a subset of components that exist on the second computerized device 120. The subset of components is included within the plurality of components necessary to render the software 140 operable on the second computerized device 120. In an example embodiment, the software configuring process 145-2 identifies that some of the components necessary to properly install and configure the software 140 on the second computerized device 120, already exist on the second computerized device 120. For example, a new revision of a database application may use an existing library. The software configuring process 145-2 creates software 140 to install the most recent version of the database application on the second computerized device 120. The software configuring process 145-2 determines that the most recent version of the database application utilizes a version of a library that currently already exists on the second computerized device 120.

In step 219, the software configuring process 145-2 removes the subset of components from the plurality of components when creating the software 140 customized for the second computerized device 120. Upon determining that the most recent version of the database application utilizes a version of a library that currently already exists on the second computerized device 120, the software configuring process 145-2 removes the library from the plurality of components compiled into the software 140 created to install and configure the database application on the second computerized device 120. Thus, the software configuring process 145-2 creates pre-configured customized software 140 that efficiently installs on the second computerized device 120.

In step 220, the software configuring process 145-2 compiles the plurality of components to create software 140 deployable on the second computerized device 120. The software is customized for the second computerized device 120 such that it is properly installed and configured on the second computerized device 120.

In step 221, the software configuring process 145-2 creates software 140 to minimize user interaction during a deployment of the software 140 on the second computerized device 120. The software 140 is customized for the second computerized device 120 such that it is properly installed and configured on the second computerized device 120 with a minimal amount of user intervention. For example, a user may only have to invoke installation of the software 140, and not be required to perform any other interaction with the software 140.

Figure 7:
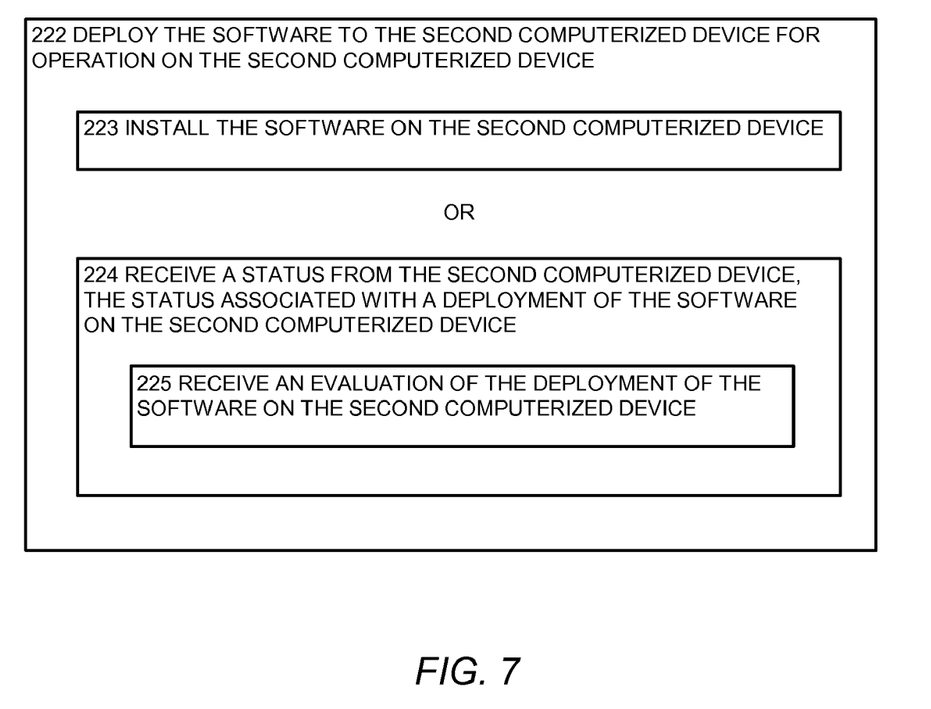
FIG. 7 illustrates a flowchart of a procedure performed by the system of FIG. 1 when the software configuring process deploys the software to the second computerized device for operation on the second computerized device, and installs the software on the second computerized device, according to embodiments disclosed herein.

FIG. 7 is a flowchart of the steps performed by the software configuring process 145-2 when it deploys the software 140 to the second computerized device 120 for operation on the second computerized device 120.

In step 222, the software configuring process 145-2 deploys the software 140 to the second computerized device 120 for operation on the second computerized device 120. In an example embodiment, the software configuring process 145-2 deploys the software 140 to the second computerized device 120 where the software 140 is installed and configured on the second computerized device 120. In an example embodiment, installing and configuring the software 140 on the second computerized device 120 is a 'one click' operation by a user operating the second computerized device 120. In other words, the installation and configuration of the software 140 on the second computerized device 120 requires minimal interaction by the user.

In step 223, the software configuring process 145-2 installs the software 140 on the second computerized device 120. In an example embodiment, the software configuring process 145-2 installs and activates the customized pre-configured software 140 on the second computerized device 120.

Alternatively, in step 224, the software configuring process 145-2 receives a status from the second computerized device 120. The status is associated with a deployment of the software 140 on the second computerized device 120. In an example embodiment, the software configuring process 145-2 must receive permission from the second computerized device 120, or a user, such as a system administrator responsible for the second computerized device 120, prior to receiving the status of the installation from the second computerized device 120.

In step 225, the software configuring process 145-2 receives an evaluation of the deployment of the software 140 on the second computerized device 120. In an example embodiment, a user, such as a system administrator, can report back an evaluation of the installation and configuration of the second computerized device 120. In another example embodiment, the software configuring process 145-2 runs an evaluation application that assesses the installation and activation of the software 140 on the second computerized device 120.

While computer systems and methods have been particularly shown and described above with references to configurations thereof, it will be understood by those skilled in the art that various changes in form and details may be made therein without departing from the scope disclosed herein. Accordingly, embodiments disclosed herein are not intended to be limited by the example configurations provided above.

What is claimed is:

1. In a first computerized device, a computer implemented method of providing software to a second computerized device, the method comprising:
deploying an agent to the second computerized device;
receiving at the first computerized device, from the agent operating on the second computerized device, configuration data specific to the second computerized device, the configuration data obtained by the agent operating on the second computerized device;
obtaining configuration data associated with at least one other computerized device in communication with the second computerized device, the configuration data, associated with the at least one other computerized device, necessary for creation of the software for the second computerized device;
requesting permission for access to obtain the configuration data from the second computerized device comprising requesting permission from a user operating the second computerized device;
notifying the user what configuration data will be obtained from the second computerized device; and
waiting to receive permission from the user prior to obtaining the configuration data from the configuration database;
wherein a security process on the second computerized device prevents malicious software from obtaining unauthorized configuration data;
creating software for the second computerized device utilizing the configuration data and the configuration data from the at least one other computerized device, the software customized based on the configuration data specific to the second computerized device, creating the software comprising:
identifying a plurality of components necessary to render the software operable on the second computerized device;
compiling the plurality of components to create a software deployable on the second computerized device, the software customized for the second computerized device; and
deploying the software to the second computerized device for operation on the second computerized device.

2. The method of claim 1 wherein deploying an agent to the second computerized device comprises:
transmitting the agent to the second computerized device to obtain the configuration data from the second computerized device.

3. The method of claim 1 wherein receiving at the first computerized device, from the agent operating on the second computerized device, configuration data specific to the second computerized device, the configuration data obtained by the agent operating on the second computerized device comprises:
receiving notification that the second computerized device requires the software.

4. The method of claim 1 wherein receiving at the first computerized device, from the agent operating on the second computerized device, configuration data specific to the second computerized device, the configuration data obtained by the agent operating on the second computerized device comprises:
obtaining the configuration data from a configuration database in communication with the second computerized device.

5. The method of claim 4 wherein obtaining the configuration data from a configuration database in communication with the second computerized device comprises:
requesting configuration data from the configuration database, the configuration data necessary to customize the software for the second computerized device.

6. The method of claim 1 wherein identifying a plurality of components necessary to render the software operable on the second computerized device comprises:
identifying a subset of components that exist on the second computerized device, the subset of components included within the plurality of components necessary to render the software operable on the second computerized device; and
removing the subset of components from the plurality of components when creating the software customized for the second computerized device.

7. The method of claim 1 wherein compiling the plurality of components to create software deployable on the second computerized device, the software customized for the second computerized device comprises:
creating the software to minimize user interaction during a deployment of the software on the second computerized device.

8. The method of claim 1 wherein deploying the software to the second computerized device for operation on the second computerized device comprises:
installing the software on the second computerized device.

9. The method of claim 1 wherein deploying the software to the second computerized device for operation on the second computerized device comprises:
receiving a status from the second computerized device, the status associated with a deployment of the software on the second computerized device.

10. The method of claim 9 wherein receiving a status from the second computerized device, the status associated with a deployment of the software on the second computerized device comprises:
receiving an evaluation of the deployment of the software on the second computerized device.

11. The method of claim 1, wherein deploying an agent to the second computerized device comprises deploying the agent to the second computerized device from the first computerized device.

12. The method of claim 1 further comprising deploying and running an evaluation application that assesses the installation and activation of the software on the second computerized device.

13. The method of claim 1, wherein the software for the second computerized device comprises application software.

14. The method of claim 13 further comprising deploying at least one installation and configuration script with the application software.

15. A computerized device comprising:
a memory;
a processor;
a communications interface;

an interconnection mechanism coupling the memory, the processor and the communications interface;

wherein the memory is encoded with a software configuring application that when executed on the processor is capable of configuring software on the computerized device by performing the operations of:

deploying an agent to the second computerized device;

receiving at the first computerized device, from the agent operating on the second computerized device, configuration data specific to the second computerized device, the configuration data obtained by the agent operating on the second computerized device;

obtaining configuration data associated with at least one other computerized device in communication with the second computerized device, the configuration data, associated with the at least one other computerized device, necessary for creation of the software for the second computerized device;

requesting permission for access to obtain the configuration data from the second computerized device comprising requesting permission from a user associated with the second computerized device;

notifying the user what configuration data will be obtained from the second computerized device;

preventing malicious software from obtaining unauthorized configuration data; and waiting to receive permission from the user prior to obtaining the configuration data;

creating software for the second computerized device utilizing the configuration data and the configuration data from the at least one other computerized device, the software customized based on the configuration data specific to the second computerized device, creating the software comprising identifying a plurality of components necessary to render the software operable on the second computerized device;

compiling the plurality of components to create a software deployable on the second computerized device, the software customized for the second computerized device; and deploying the software to the second computerized device for operation on the second computerized device.

16. The computerized device of claim 15 wherein when the computerized device performs the operation of receiving at the first computerized device, from the agent operating on the second computerized device, configuration data specific to the second computerized device, the configuration data obtained by the agent operating on the second computerized device, the computerized device performs the operations of:

obtaining the configuration data from a configuration database in communication with the second computerized device.

17. The computerized device of claim 15 wherein when the computerized device performs the operation of receiving at the first computerized device, from the agent operating on the second computerized device, configuration data specific to the second computerized device, the configuration data obtained by the agent operating on the second computerized device.

18. The computerized device of claim 15 wherein when the computerized device performs the operation of deploying the software to the second computerized device for operation on the second computerized device, the computerized device performs the operations of:

receiving a status from the second computerized device, the status associated with a deployment of the software on the second computerized device.

19. A computer readable medium encoded with computer programming logic that when executed on a process in a computerized device configures software, the medium comprising:

instructions for deploying an agent to the second computerized device;

instructions for receiving at the first computerized device, from the agent operating on the second computerized device, configuration data specific to the second computerized device, the configuration data obtained by the agent operating on the second computerized device;

instructions for obtaining configuration data associated with at least one other computerized device in communication with the second computerized device, the configuration data, associated with the at least one other computerized device, necessary for creation of the software for the second computerized device;

instructions for requesting permission for access to obtain the configuration data from the second computerized device comprising requesting permission from a user associated with the second computerized device;

notifying the user what configuration data will be obtained from the second computerized device;

instructions for preventing malicious software from obtaining unauthorized configuration data; and instructions for waiting to receive permission from the user prior to obtaining the configuration data from the configuration database;

instructions for creating software for the second computerized device utilizing the configuration data and the configuration data from the at least one other computerized device, the software customized based on the configuration data specific to the second computerized device, creating the software comprising identifying a plurality of components necessary to render the software operable on the second computerized device;

instructions for compiling the plurality of components to create a software deployable on the second computerized device, the software customized for the second computerized device; and instructions for deploying the software to the second computerized device for operation on the second computerized device.

20. In a first computerized device, a computer implemented method of providing software to a second computerized device, the method comprising:

deploying an agent to the second computerized device;

receiving at the first computerized device, from the agent operating on the second computerized device, configuration data specific to the second computerized device, the configuration data obtained by the agent operating on the second computerized device;

preventing malicious software from obtaining unauthorized configuration data;

obtaining configuration data associated with at least one other computerized device in communication with the second computerized device, the configuration data, associated with the at least one other computerized device, necessary for creation of the software for the second computerized device;

utilizing the configuration data from the at least one other computerized device to create pre-configured customized software for the second computerized device creating software for the second computerized device utilizing the configuration data and the configuration data from the at least one other computerized device, the software customized based on the configuration data specific to the second computerized device, creating the software comprising:

identifying a plurality of components necessary to render the software operable on the second computerized device;

compiling the plurality of components to create a software deployable on the second computerized device, the software customized for the second computerized device; and deploying the software to the second computerized device for operation on the second computerized device.

* * * * *